(12) United States Patent
Dale et al.

(10) Patent No.: US 7,681,201 B2
(45) Date of Patent: Mar. 16, 2010

(54) METHOD AND SYSTEM FOR INTEGRATING AND CONTROLLING COMPONENTS AND SUBSYSTEMS

(75) Inventors: Allan Dale, Haslett, MI (US); Thomas Bayerl, Williamston, MI (US); Craig Mahaney, Milan, MI (US)

(73) Assignee: Lectronix, Lansing, MI (US)

( * ) Notice: Subject to any disclaimer, the term of this patent is extended or adjusted under 35 U.S.C. 154(b) by 0 days.

(21) Appl. No.: 11/834,183

(22) Filed: Aug. 6, 2007

(65) Prior Publication Data

US 2008/0034379 A1 Feb. 7, 2008

Related U.S. Application Data

(60) Provisional application No. 60/835,558, filed on Aug. 4, 2006.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................... 719/313; 701/29; 701/200; 709/227; 709/238

(58) Field of Classification Search ............. 701/1, 701/2, 29, 200; 717/100–161; 719/311–320, 719/313; 709/227, 238
See application file for complete search history.

(56) References Cited

U.S. PATENT DOCUMENTS

| 5,361,336 | A | 11/1994 | Atchison |
|---|---|---|---|
| 5,630,164 | A | 5/1997 | Williams et al. |
| 5,794,164 | A | 8/1998 | Beckert et al. |
| 5,847,955 | A | 12/1998 | Mitchell et al. |
| 5,905,433 | A | 5/1999 | Wortham |
| 5,999,091 | A | 12/1999 | Wortham |
| 6,253,122 | B1 * | 6/2001 | Razavi et al. .................. 701/1 |
| 6,311,149 | B1 | 10/2001 | Ryan et al. |
| 6,349,257 | B1 | 2/2002 | Liu et al. |
| 6,550,052 | B1 | 4/2003 | Joyce et al. |
| 6,559,773 | B1 | 5/2003 | Berry |
| 6,775,598 | B2 | 8/2004 | Bergmann et al. |
| 6,785,595 | B2 | 8/2004 | Kominami et al. |
| 6,791,481 | B2 | 9/2004 | Altare et al. |

(Continued)

FOREIGN PATENT DOCUMENTS

GB 2120424 A 11/1983

(Continued)

OTHER PUBLICATIONS

European Search Report for corresponding European Application No. 06825644.5, mailed Nov. 27, 2009, 5 pages.

*Primary Examiner*—Diem K Cao
(74) *Attorney, Agent, or Firm*—Brooks Kushman P.C.

(57) ABSTRACT

A method and system for integrating and controlling a hardware device having one or more embedded systems including one or more hardware components configurable for use with the hardware device and one or more operating systems for use with the one or more hardware components. A control module configurable for use with the one or more hardware components and one or more operating systems accesses and controls the one or more hardware components with the hardware device. The control module generates and displays access and control commands on the hardware device to allow user to operate and manage the embedded system.

14 Claims, 4 Drawing Sheets

U.S. PATENT DOCUMENTS

| | | | |
|---|---|---|---|
| 6,931,556 | B2 | 8/2005 | Bhogal et al. |
| 6,993,421 | B2 | 1/2006 | Pillar et al. |
| 7,009,504 | B1 | 3/2006 | Banter et al. |
| 7,069,546 | B2 * | 6/2006 | Tsarfati ...................... 717/149 |
| 7,123,972 | B2 | 10/2006 | Lee |
| 7,152,027 | B2 | 12/2006 | Andrade et al. |
| 7,269,482 | B1 * | 9/2007 | Shultz et al. ................... 701/1 |
| 7,302,322 | B1 | 11/2007 | Szczerba et al. |
| 7,613,813 | B2 * | 11/2009 | Hussain et al. ............. 709/227 |
| 2001/0002454 | A1 * | 5/2001 | Narumi et al. ............. 701/200 |
| 2002/0171567 | A1 | 11/2002 | Altare et al. |
| 2003/0005026 | A1 | 1/2003 | Bower, III |
| 2003/0135842 | A1 * | 7/2003 | Frey et al. ................... 717/121 |
| 2003/0196187 | A1 * | 10/2003 | Kodosky et al. ........... 717/109 |
| 2004/0133879 | A1 | 7/2004 | Yoshimura et al. |
| 2004/0199534 | A1 | 10/2004 | Juszkiewicz |
| 2005/0038581 | A1 * | 2/2005 | Kapolka et al. ............... 701/29 |
| 2005/0050557 | A1 | 3/2005 | Gabryjelski et al. |
| 2005/0060426 | A1 * | 3/2005 | Samuels et al. ............. 709/238 |
| 2005/0083810 | A1 | 4/2005 | Sugiyama |
| 2005/0102687 | A1 * | 5/2005 | Mathur et al. ................ 719/328 |
| 2005/0120340 | A1 * | 6/2005 | Skazinski et al. ........... 717/140 |
| 2005/0185526 | A1 | 8/2005 | Altare |
| 2005/0209832 | A1 * | 9/2005 | Kasravi et al. .................. 703/1 |
| 2006/0036992 | A1 | 2/2006 | Hayles et al. |
| 2006/0075119 | A1 * | 4/2006 | Hussain et al. ............. 709/227 |
| 2006/0089754 | A1 | 4/2006 | Mortenson |
| 2007/0044078 | A1 | 2/2007 | Cifra |
| 2007/0124451 | A1 * | 5/2007 | Joshi et al. .................. 709/223 |
| 2007/0287135 | A1 | 12/2007 | Jeon et al. |

FOREIGN PATENT DOCUMENTS

| | | |
|---|---|---|
| WO | 0077616 A2 | 12/2000 |

* cited by examiner

METHOD AND SYSTEM FOR INTEGRATING AND CONTROLLING COMPONENTS AND SUBSYSTEMS

CROSS-REFERENCE TO RELATED APPLICATIONS

This application claims the benefit of U.S. provisional application Ser. No. 60/835,558 filed Aug. 4, 2006.

BACKGROUND OF THE INVENTION

1. Field of the Invention

The present invention relates to a method and system for integrating, developing and controlling components and subsystems for use in an embedded system.

2. Background Art

Manufacturers and suppliers, such as automobile and consumer electronics manufacturers and suppliers, face challenges when attempting to integrate discrete components and subsystems as embedded systems. As the demand for feature content of the hardware and related software components and subsystems increases, manufacturers and suppliers face challenges to integrate these discrete components as embedded systems in a manner that maximizes productivity in integration and increases the reliability of these efforts. In many cases, these "bag of parts" are a diverse and sometimes incompatible mix of software and hardware components. Further, there may be issues relating to validation, reliability and performance of the system once the diverse software and hardware components are integrated. It would be advantageous to provide a method and system for integrating and controlling multiple components and subsystems for use as embedded systems that allows for reuse across many diverse products and platforms by multiple vendors.

SUMMARY OF THE INVENTION

A method and system for integrating and controlling components and subsystems for use in an embedded system includes a computer-implemented method for development of a module for controlling an embedded system is disclosed. The method includes providing an abstraction layer for the one or more operating systems of the embedded system. One or more device drivers compatible for use with the one or more hardware components and operating systems of the embedded system are provided and may be used by the abstraction layer to function under the one or more operating systems of the embedded systems to create a control module.

A client server architecture may be created for the control module to use the abstraction layer to function under the one or more operating systems of the embedded system to interface between the one or more device drivers to control the functions of the one or more hardware components. The system and method may also include a tangible machine readable medium having instructions for generating a control module for one or more embedded systems, that when executed cause the machine to create the module as described herein.

DETAILED DESCRIPTION OF THE PREFERRED EMBODIMENTS

Figure 1:
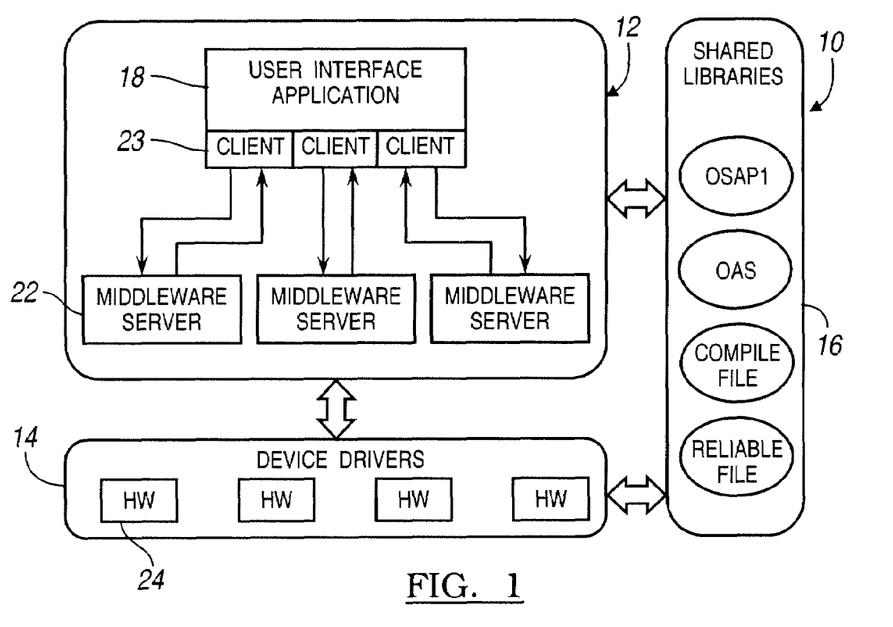
FIG. 1 shows a diagram of a method for development of a control module for integrating components and subsystems according to one exemplary embodiment of the present invention.

Referring now to the Figures, a method and system for integrating and controlling components and subsystems for use in an embedded system is disclosed. Referring to FIG. 1, the architecture of the method and system for creating a control module for use with an embedded system developed with the present invention is illustrated. It is understood that the control module used with the system may be of various configurations and may contain greater or fewer number of components to accomplish similar objectives. An embedded system, for exemplary purposes, may be considered a set of hardware and software dedicated to a particular purpose or use.

An embedded system may be embedded in a higher level system to perform the particular function or any electronic system that uses a processor. Such systems generally use microprocessors, or they may use custom-designed chips or both. It is understood that the system and method described herein may also be used in a computing environment, such as a distributed computing environment.

The method for developing a control module for use in controlling an embedded system includes the use of an architecture that allows for portability, modularity, is easily distributable and accommodates replaceable user interfaces. Portability addresses the need to be able to move the system functionality rapidly to new hardware platforms and operating systems. At least two of the elements used to achieve this are the operating system abstraction (OSAPI) shared library, which may provide a generic portable abstraction of operating system specific calls, and the use of layered device drivers, which can be rapidly ported across different hardware and operating system platforms.

Modularity deals with the ability to easily create control module builds that include or exclude sets of features. One element of modularity is packaging functionality into separate processes, since this helps prevent functions from becoming entwined with one another. In distributed systems, processes that may be geographically diverse intercommunicate over a networked communication path to produce a single cohesive system out of independent processing modules. Like many distributed systems, the current method and system uses a client-server architecture between processes.

The system and method of the present invention may be configured for use with derivative products requiring the user interface process be maintained as a discrete module that can be modified or replaced on a per-product basis. This allows the functionality of the platform to be repackaged with entirely unique look and feel. While the architecture as a whole has been constructed to achieve these goals, it is still important to consider underlying rationales while implementing specific software components to avoid practices that defeat the intended flexibility. For example, a user interface that talks extensively to device drivers and other local services may still be portable and modular, but loses the ability to be distributed across the network, whereas this distribution is possible if the application limits its access to client-server calls to the servers.

Figure 2:
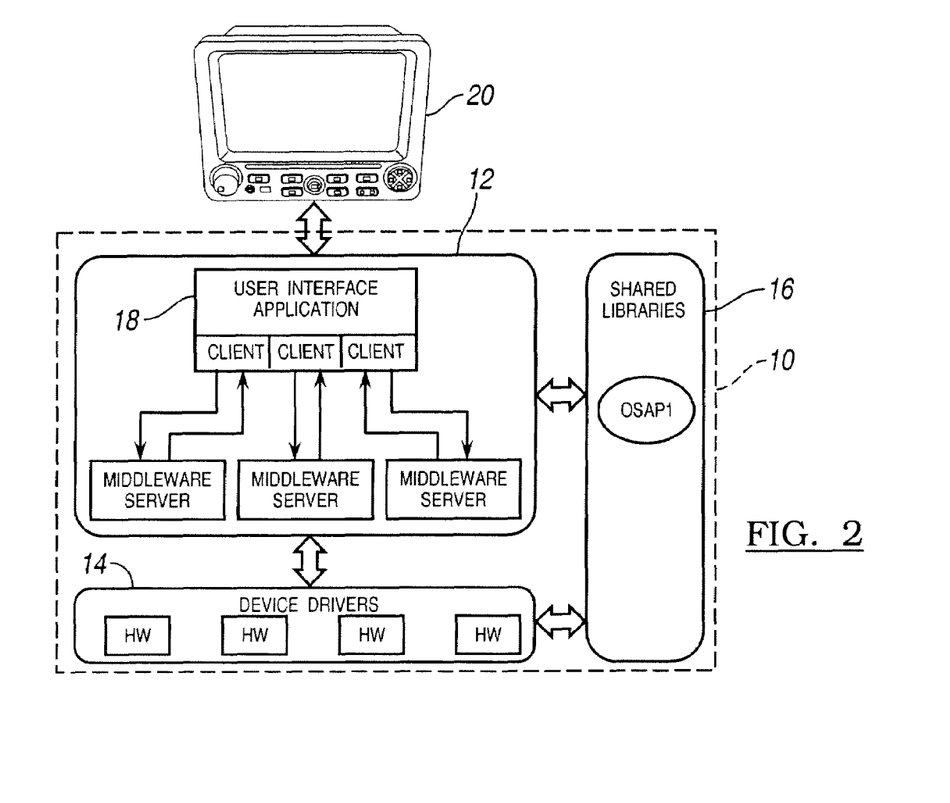
FIG. 2 shows a diagram of a control module for use in an embedded system incorporated in a product according to one exemplary embodiment of the present invention.

The exemplary control module 10 for use in an embedded system created with the method according to the present invention is illustrated in FIG. 1. Control module 10 includes a client-server architecture 12 interfacing with one or more device drivers 14 and a shared operating system abstraction library (OSAPI) 16. These components cooperate with a user interface application shown in block 18 to present various information to an operator. User interface 18 may cooperate with one or more clients 23 configured work in connection with a discrete hardware component 20 as shown in FIG. 2 or may be configured to work with a variety of third party devices to display relevant information or controls to the user. It is contemplated that the user interface and high-level applications act as clients to the servers.

In one exemplary embodiment, a computer-implemented method for development of a module for controlling an embedded system, may comprise at least the following steps of providing an abstraction layer for the one or more operating systems of the embedded system. The method identifies the one or more client hardware components and one or more operating systems of the embedded system. One or more device drivers compatible for use with the one or more hardware components of the embedded system using the abstraction layer to function under the one or more operating systems of the embedded system are obtained.

A client server architecture using the abstraction layer to function under the one or more operating systems of the embedded system to interface between the one or more device drivers to control the functions of the one or more hardware components is created for the control module. It is understood that the system and method may also include a tangible machine readable medium having instructions for generating a control module for one or more embedded systems, that when executed cause the machine to create the module as described herein.

Figure 3:
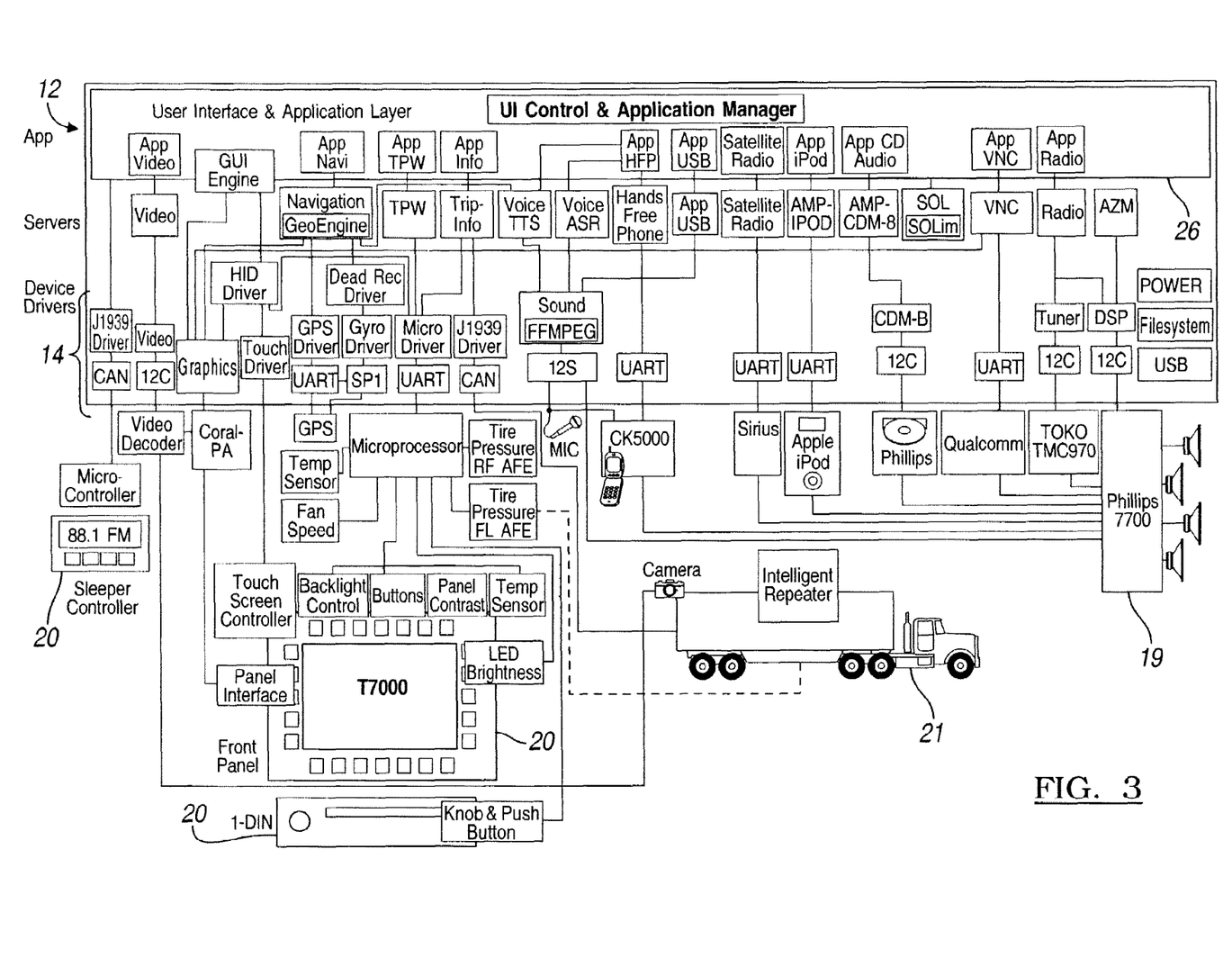
FIG. 3 shows a diagram of a control module of an embedded system having multiple components created with the method of the present invention.

Referring now to FIGS. 1 and 3, software components of the control module 10 may include one or more client-server processes, device drivers and shared runtime libraries, all of which may utilize OSAPI for use in the embedded system 19, for example, in a vehicle 21. OSAPI 16 provides a layer that converts abstracted calls into operating specific calls as will be described in greater detail below. A client-server process may be an independent executable module, containing one or more execution threads, that runs within its own protected memory space. In the system platform 10 illustrated in FIG. 1, user interface client process 18 communicates to and controls a set of middleware logic or server processes 22 that each provide a specific service. These processes communicate using a client-server model shown by reference numeral 12. It is understood that middleware may function, but is not required to, function as a server element.

Functionality may be implemented in servers 22 in the client server model 12 to monitor and control the integrated technology connected to the system. Servers 22 maintain portability by using the OSAPI abstraction layer for its operating system and hardware access requirements. The functionality incorporated as part of the client server architecture includes creating logic in communication with the abstraction layer for management and control of the one or more hardware components and creating a user interface in communication with the servers to display commands for use by an operator of the embedded system to control the one or more hardware components. The abstraction layer provides operating system and hardware component access requirements to the client server architecture to allow control of the embedded system. Client-server architecture may also include a single user interface for one or more servers to display commands for use by the user to operate the embedded system that may be graphically displayed on a video display screen incorporated in the embedded system.

FIG. 3 illustrates an exemplary system with multiple components in a vehicle 21. The client-server interfaces of the servers are described and illustrated. The interface consists of client object method functions used to control the corresponding server, and server responses that are generated in response or to notify of changed status. The message payload of the client calls to the server may be completely hidden within the client interface objects.

One or more device drivers 14, individually represented by reference numeral 24, may include elements to provide connection, access and/or control to the hardware devices within the system. In some cases, common services may be required for use by multiple processes or device drivers. Device drivers may be program routines that link the operating system to a component or device. The drivers typically contain the machine language necessary to perform the functions requested by the application.

Rather than build such common software into each process or driver, a single instance of such code can be placed into a shared common library 16. The mechanism to support this may vary by operating system used in connection with the components or subsystem, such as Windows CE and QNX. In the system platform 10, the library 16 may be used for services such as the OSAPI abstraction layer and configuration file access.

Referring now to FIG. 3, a description of the device driver configuration for use in connection with the present invention is described in greater detail. System platform device drivers 14 may comprise layered drivers having two or more layers associated therewith. In one exemplary embodiment, layered device driver includes a first layer or command layer and a second layer or access layer. The layered drivers may be configured to work with the client server architecture to provide instructions and/or commands to the components to access, operate and/or control one or more components and features of the components.

Figure 4:
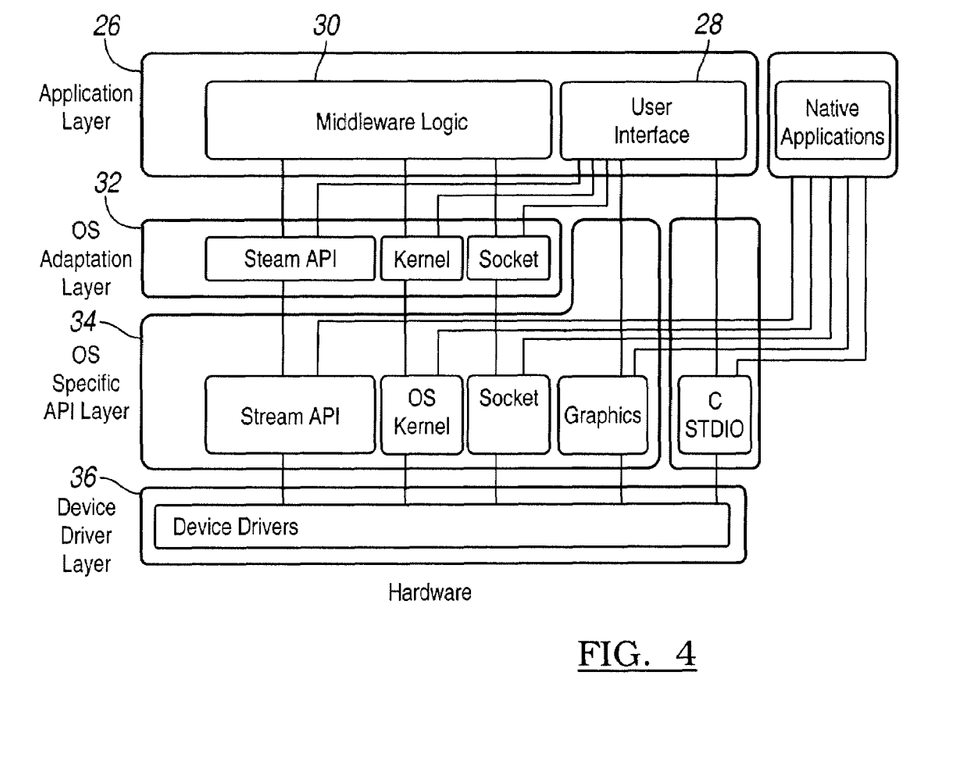
FIG. 4 shows a diagram of abstraction and device layers of an exemplary control created in accordance with the method of the present invention.

The various layers of the control module for use with the system of the present invention are further called out in FIG. 4. In addition to the device driver layer 36 described above, the application layer 26 includes the user interface 28 and servers 30. The user interface box represents the graphics rendering and other operating system specific input/output portions of the application. In one exemplary embodiment, the user interface communicates with the servers through TCP/IP InterProcess Communication (IPC).

The system architecture considers the graphics rendering of the user interface 28 to be operating system dependent. However, the user interface 28 may also run on multiple operating systems with a component designed to handle operating system specific matters. Servers 30 provide the core application functions including radio, jukebox, audio media player, trip computer and overall system control among other modules. The servers maintain portability by using the OSAPI abstraction layer for its operating system and hardware access requirements.

The system includes an OSAPI adaptation layer 32 that converts abstracted calls into operating system specific calls. An abstraction layer typically implies that there are two or more implementations of the target program, so that one set of program calls, or application programming interfaces (API) works on different platforms or environments. An API may include a language and message format used by an application program to communicate with the operating system or some other control program such as a communications protocol. APIs may be implemented by writing function calls in the program, which provide the linkage to the required subroutine for execution.

The OSAPI adaptation layer 32 cooperates with an operating specific API layer 34 for various operating systems such as Windows NT, Windows CE and QNX among others. The OSAPI adaptation layer does not preclude the use of existing off-the-shelf applications in the system. While the applications may be operating system specific, they may also include internal operating system abstractions of their own that make them portable for use in various systems and configurations.

Figure 5:
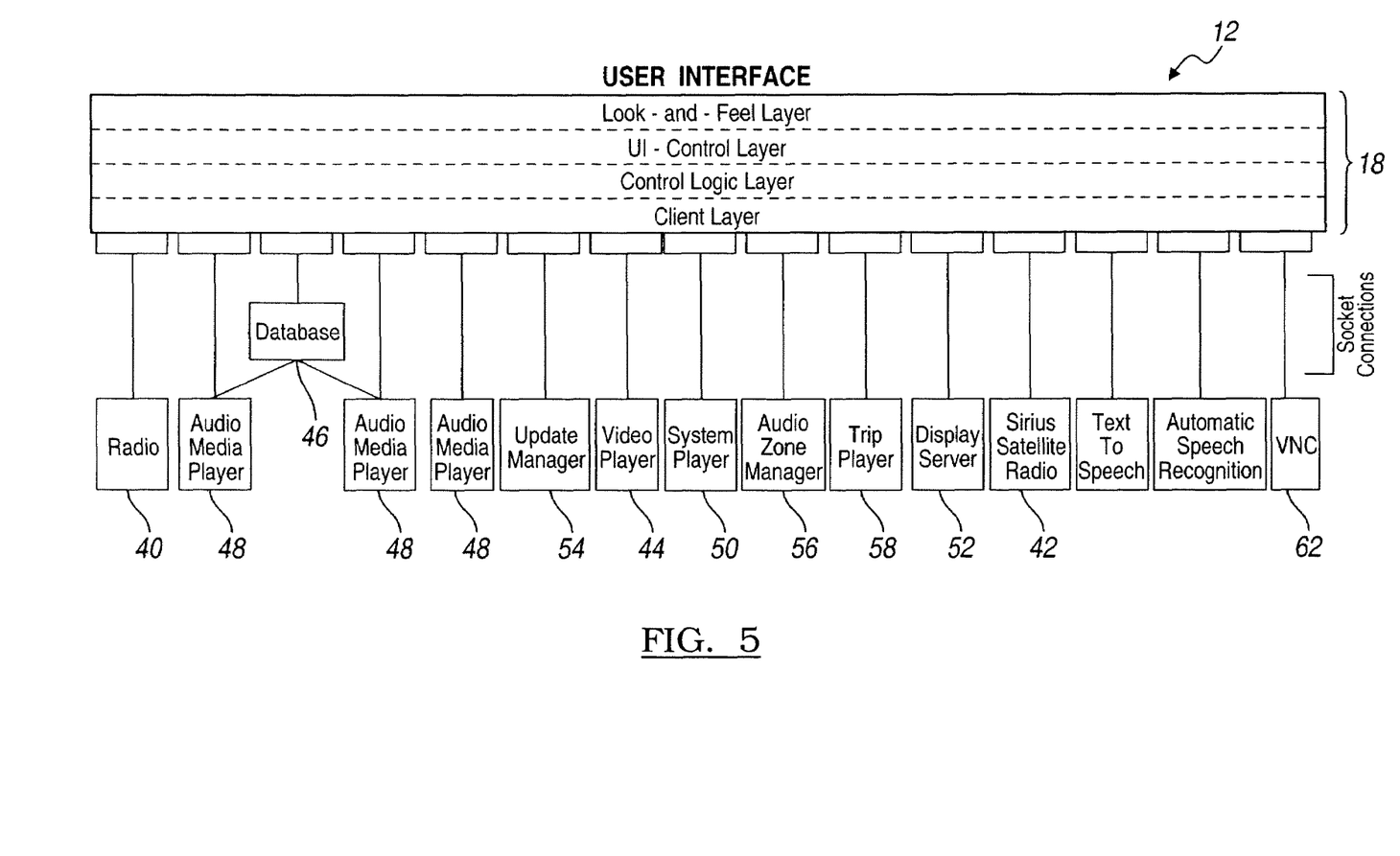
FIG. 5 shows a diagram of an exemplary client-server architecture of a control module illustrated in FIG. 2 and configured for use in connection with the present invention.
Figure 6:
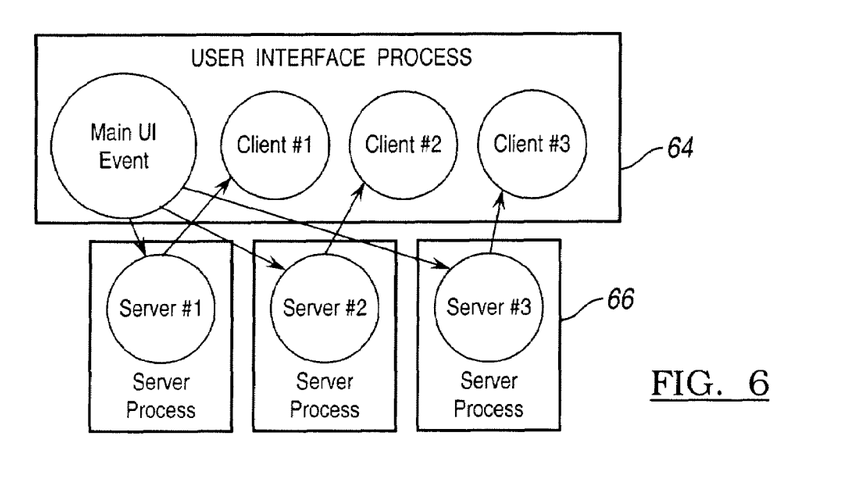
FIG. 6 shows a diagram of a user interface process in a three server application in a control module created with the method of the present invention.

Referring now to FIGS. 3, 5 and 6, an embedded system having an application or control module created using the method of the present invention is illustrated. The client server portion 12 of the application may be configured for use in connection with one or more embedded systems in a vehicle. As explained above, it is understood that the method and system of the present invention may be configured for use in various industries for a variety of applications, such as in the consumer electronics industry with cell phones and personal digital assistants (PDA) or in connection with point of sale terminals sold to retailers.

In one aspect of the present invention, a client-server architecture 12 utilizes high-level InterProcess Communications (IPC) abstracted components consisting of a client portion and a server portion. The software interface to the IPC may be built to use a variety of communication methods and/or communications protocols, such as the TCP/IP BSD socket layer. The interface may be incorporated within OSAPI or programming language client objects that expose method calls for all middle-ware services.

The Transmission Control Protocol (TCP) stream socket type may be used to provide guaranteed and in-order delivery of packets. Additionally, the keep-alive property is used to ensure the sockets stay connected even when data flows are sparse. Further, the client side will attempt to reconnect to the server if a broken link is detected. Thus, clients will gravitate to a new server if a server was shut down and restarted for any reason.

For each client-server connection, two socket connections may be established. Each of these connections carries a full-duplex packet stream between client and server. One of two connections used to carry asynchronous messages (commands) from the client to the server. When the server receives messages on this connection, the protocol layer automatically responds with an acknowledgment over that same connection back to the client. The second connection is used in a similar manner, but in the reverse direction for messages that originate from the server (such as responses or status updates) and are acknowledged by the client.

A client object exposes method functions for control to the client application. These method functions transmit appropriate commands over the TCP/IP socket to the server where a function is invoked to process the command. Once the client interface transmits the command to the server, it enters into a blocking wait for an acknowledgment from the server. In the event of a timeout, the request is retransmitted. Otherwise, until the acknowledgment is received, execution of the calling client thread is stalled.

When the server process receives the message, the protocol layer automatically sends the acknowledgment back to the client. This acknowledgment is sent prior to processing the command, and is an indication only that the packet was received, not that its contents are valid. Sending the acknowledgment prior to processing the message ensures that the stalled client thread is freed to continue execution as quickly as possible.

In this example, the server process generates a status message back to the client in response to the command. For example, the server process may send back to the client information regarding the frequency to which the radio server is tuned. This message travels across the second socket connection. A dedicated thread in the client process receives the incoming status message, returns an immediate acknowledgment to the server, and then invokes the application's function to process the incoming message or status update. The application's function is registered by the application layer when it initiates the client interface object.

In another example, the basic execution thread may include the main user interface (UI) event thread blocks waiting for user inputs, such as button presses. Based on user input, the UI server process calls the appropriate client object methods to control the servers. Next, the main server thread blocks waiting for commands over the client-server connection. When executing received commands, the server generates response messages, such as status updates back to the client. Next, client interface threads, for which there may be one for each client in the user interface process, block waiting for status updates from the server or servers.

FIG. 6 illustrates the basic threads that might exist in a typical three-server application of the system framework. A basic user interface process 64 would typically consist of a single input event thread, and a dedicated listener thread for each client interface that receives status updates from the server. The user interface application may explicitly create these threads or create the threads as part of the client interface object instantiation and are the threads that are active whenever the application's functions are invoked due to incoming server status messages. More complex processing requirements often introduce additional client or server worker threads that are not depicted in the Figure.

Threads on either the client or server side 66 that send messages always wind up stalled until the other side responds with an acknowledgment. In both the client and server protocol implementations, this acknowledgment generation is protected with a mutex that only permits processing of one command at a time. This protection introduces some synchronization between the client and servers. Assuming an initial idle state, when client or server initially sends a message, the opposite side will take the mutex, send an immediate acknowledgment, and then begin processing the message. If an additional message is sent while the first message is still being processed, the sending process will wind up blocked waiting for its acknowledgment until the first message completes and the mutex is released.

This generally single-threads the command processing and response generation between the processes. It is not possible for the user interface, for example, to generate a "flood" of queued messages to a single server, since the calling thread will start to stall after the initial immediately acknowledged message until the server catches up.

In general, the responses and status events from the servers are handled as asynchronous events. The typical execution flow is the client-side sends a command and then is later notified by an asynchronous message from the server of any status changes. In a few cases an additional layer to block the calling client until a response is received by way of a synchronous response has been implemented, most notably for query calls to the SQL database server.

Referring back to FIG. 5, exemplary embedded systems incorporating one or more control modules in accordance with system and method of the present invention in the client server architecture 12 are described and illustrated. It is understood that the system platform may be configured to control a plurality of systems and components for vehicles, including vehicle control systems, vehicle condition monitoring systems, communications, telematics, climate control and navigation and entertainment components, such as portable media devices, mobile telephones, media players tuners and storage devices. Exemplary components are described for reference purposes.

Block 40 represents a radio component. The AM/FM radio server handles all tuning aspects of the AM/FM tuner module in the system platform. It provides basic tune, seek, and scan support. Radio servers are implemented with and without built in preset support. Preset information may be maintained by the user interface application using the database server rather than built in to the radio server. As illustrated in FIG. 4, the AM/FM radio server component 40 typically includes a connection to one or more device drivers 41 that cooperate with the component 41 to allow the client-server platform to control the device.

Block 42 represents a satellite radio component. The satellite radio server may communicate to the satellite receiver module via a communications link, such as a serial communications link. It is understood that one or more of the exemplary components described herein may be included or removed from the system based on customer preference. Further, additional components not described herein may be incorporated and controlled in the system. Device drivers are typically provided in connection with these components to allow integration and control of the device.

Block 44 represents a video server and video media player. Hardware component 20 of the system 10 illustrated in FIG. 1 supports display of video-in-a-window on its main LCD display. This server component manages the video overlay region size and position and provides an interface to control what video source is displayed in the overlay window.

Block 46 represents a local database service. A local database is used by various server components to hold information about internal and removable content, such as audio content. The user interface layer code utilizes the information in the database both for display purposes during playback and to assist in the creation of song lists. The interface to the database engine is raw SQL commands. A single-threaded interface to the local database service is desirable in most every instance of its use.

Block 48 represent an audio media player (AMP) server. Several different types of audio media players conform to this class, including but not limited to File Server Players, ATAPI players, and Smart Device Players. Each Audio Media Player has a Song Selector, Play List Selector, and an associated Media Device. The Media Device may be responsible for detecting the presence and status, such as the insertion and ejection, of media. The Media Device may also be responsible for interrogating the media for file types and processing them.

The Audio Media Player establishes a client to the Audio Zone Manager (AZM). The AZM broadcasts what audio source is in each zone. Each Audio Media Player can use this to determine when to request or relinquish use of the particular shared Sound Device Driver the Audio Media Player may be associated with at the time.

Block 50 represents a system player. The system player server component allows user interface code access to retrieve current real-time clock data and to power down the system. Additionally the component handles the controls for the audio amplifiers with respect to sleep and mute, though there is no direct client control.

Block 52 represents a display server. The display server component handles manipulations of display parameters according to user requests and vehicle controls. One such example is the LCD display backlight intensity. The user may wish to modify the intensity to different values when the headlamps are on and when they are off. Additionally, the backlight intensity may change according to the dash illumination dimmer control. The display server makes a connection to the Trip Player to obtain the parameter for use in setting the display backlight intensity.

Block 54 represents an update manager component. The update manager server component handles the specifics of updating various system software and data file components from removable media. The update manager can accomplish updates of the boot image and application image in Flash, license files, and other content such as navigation and entertainment databases. The update manager detects the presence of update media, as indicated by the presence of one or more update files and/or license files. The update manager works with the license manager to accomplish updates.

Block 56 represents an Audio Zone Manager (AZM). The system may be designed to manage either a single zone or multiple zone configurations. The AZM is the point of control for what audio source is playing in which zone. Audio characteristics (e.g. volume, tone, equalization, balance, etc.) are controllable on a per-zone basis. The AZM also provides a method whereby a priority audio message can be played over any audio source in a zone. This feature is useful for handling high priority messages for applications such as voice-assisted navigation prompts.

Block 58 represents a system monitor or trip player component. The trip player server component provides an IPC interface to vehicle information. It aggregates information provided by any number of device drivers that implemented the Vehicle Information interface. Limits on each parameter are driven from configuration files. As well as raw information the trip player provides trip computer functions including calculating values such as gallons-of-fuel-to-go to complete trip, etc. The trip player maintains a central repository for checklists (e.g. departure, arrival, etc.). The number of checklists and their contents is driven by configuration files.

The trip player maintains a central repository for maintenance items, e.g. tire rotation, oil change, etc. The service rate for maintenance items is specified in terms of miles. The maintenance items are driven by configuration files. The checklists are configurable text that does not change dynamically, so clients can request it as required. Vehicle parameters do change dynamically. Clients can register to receive periodic updates of any number of parameters. The update rate is a configuration parameter for the trip player as a whole.

Block 60 represents a license manage server, which accesses licensing information for use by the system. Block 62 represents a navigation system having a variety of functions for monitoring and displaying driver assistance information, including route guidance, map rendering and vehicle location. It is contemplated that the system may manage and control a variety of other components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for use within a vehicle to control a vehicle infotainment server according to user inputs received through each of a first user interface client, a second user interface client, and a voice recognition client, the method comprising:

establishing two-socket, client-server connections between the server and each client, each two-socket connection establishing separate first and second, duplex communication channels sufficient to support message communications between the server and each client;

communicating commands from each client receiving user inputs to the server, the commands reflecting the user inputs and being communicated only over the associated first socket of the clients;

intercepting each of the commands with an abstraction layer, the abstraction layer being configured to convert the commands to at least one of a first protocol and a second protocol depending on whether an operating system is one of a first type and a second type, the abstraction layer supporting commands independently of the operating system such that the operating system can be changed between at least the first and second type without requiring corresponding changes in the commands;

communicating acknowledgements from the server to each client that communicates the commands, the server communicating only one acknowledgement for each command, the server only communicating the acknowledgement over the associated first socket of the clients and after the command has been accepted by the server for further processing;

blocking each of the command communicating clients from communicating further commands to the server and from executing additional operations dependent on a response of the server to the command until that client receives the acknowledgement from the server; and communicating the response of the server to each command over only the second socket connection of the client that communicated the command, the communication of the response over the second socket freeing the first socket for use by the client in communicating a subsequent command prior to receipt of the response;

wherein the blocking further comprising the abstraction layer issuing blocking instructions to each of the clients that transmit commands, the blocking instructions preventing the receiving clients from executing additional operations dependent on the response of the server to the command until that client receives the acknowledgement from the server.

2. The method of claim 1 further comprising each client transmitting the command re-transmitting the command if the server fails to send that client the acknowledgement within a predefined period of time.

3. The method of claim 2 further comprising the server, for at least one of the responses, instructing a device driver to execute an operation specific to the response.

4. The method of claim 3 wherein the operation specific to the response includes instructing the device driver of a radio to tune from a first frequency to a second frequency.

5. The method of claim 4 further comprising each of the clients that transmitted the command resulting in tuning of the radio from the first frequency to the second frequency, the server, and the device driver independently communicating calls to the operating system to request resources necessary to executing the associated commands.

6. The method of claim 1 further comprising an operating system used to control operations of the server and the clients issuing blocking instructions to each of the clients that transmit commands, the blocking instructions preventing the receiving clients from executing additional operations dependent on the response of the server to the command until that client receives the acknowledgement from the server.

7. The method of claim 1 further comprising communicating an update from the server for each response, the update being communicated to each of the clients except for the client that necessitated the response, the update informing the clients with respect to the response and only being communicated over the second socket connection of each client.

8. The method of claim 1 further comprising each client receiving responses communicating a related acknowledgment over the same second socket connection used to communicate the response.

9. The method of claim 1 further comprising the acknowledgements indicating receipt of the corresponding command and not that the command was successfully processed by the server.

10. A method for use within a vehicle wherein a server issues instructions to devices drivers of a number of vehicle subsystems in order to control the subsystems to perform specific vehicle operations, the method comprising:

associating each vehicle subsystem with a server, each server logically executing processes related to operations to be performed by the associated vehicle subsystem and issuing instructions that are used by the associated driver to implement the operations;

associating the servers with one or more clients, each client having a user interface through which user inputs used to control one or more of the vehicle subsystems are communicated;

establishing a communication channel between each client and the server associated with the vehicle subsystem that is to be controlled by that client, wherein the establishing comprising establishing two-socket, client-server connections between each server and client, each two-socket connection establishing separate first and second sockets sufficient to support message communications therebetween;

communicating commands from each client receiving user inputs to the associated servers over the established communication channel, the commands reflecting operations of the vehicle subsystems to be performed according particulars of the user inputs;

communicating acknowledgements from the servers to each client that communicated the commands, each server communicating only one acknowledgement per command;

blocking each of the command communicating clients from communicating further commands to the same server and from executing additional operations dependent on a response of the server to the communicated command until that client receives the acknowledgement from the server;

allocating resources to each of the servers, clients, and device drivers necessary to implement the vehicle subsystem operations prompted by the user input according to instructions received from a vehicle operation system, the vehicle operating system allocating the resources as a function of calls received from the servers, clients, and device drivers;

after the calls are issued from the servers, clients, and device drivers, and prior to receipt of the calls by the operating system, processing the calls with an abstraction layer, the abstraction layer being configured to convert the calls according to protocols of the operating system and the servers, clients, and device drivers, the abstraction layer to converting the calls to at least one of a first protocol and a second protocol depending on whether the operating system is one of a first type and a second type; and limiting transmission of the commands and the acknowledgments to each of the first sockets and transmission of the responses to the second sockets.

11. The method of claim 10 further comprising the abstraction layer issuing blocking instructions to each of the clients that transmits commands, the blocking instructions preventing the command communicating clients from communicating further commands to the same server and from executing additional operations dependent on a response of the server to the communicated command until that client receives the acknowledgement from the server.

12. The method of claim 10 further comprising each commanded server issuing a response to the commanding client upon corresponding implementation of the vehicle subsystem operation prompted by the associated user input.

13. The method of claim 12 further comprising each commanded server issuing an update to each of the non-commanding clients in communication therewith, the updates indicating a change in status of the device driver used to implement the vehicle subsystem operation.

14. The method of claim 12 further comprising each commanded server issuing the response only after the operating system allocates the resources necessary to implement the vehicle subsystem operation and after communicating the associated acknowledgement.

* * * * *